No. 778,022. PATENTED DEC. 20, 1904.
O. S. FELLOWS & A. E. HOPKINS.
CAN CONTROLLING AND SEPARATING APPARATUS.
APPLICATION FILED DEC. 1, 1903.
NO MODEL. 7 SHEETS—SHEET 1.

No. 778,022. PATENTED DEC. 20, 1904.
O. S. FELLOWS & A. E. HOPKINS.
CAN CONTROLLING AND SEPARATING APPARATUS.
APPLICATION FILED DEC. 1, 1903.
NO MODEL. 7 SHEETS—SHEET 2.

No. 778,022. PATENTED DEC. 20, 1904.
O. S. FELLOWS & A. E. HOPKINS.
CAN CONTROLLING AND SEPARATING APPARATUS.
APPLICATION FILED DEC. 1, 1903.
NO MODEL. 7 SHEETS—SHEET 5.

Witnesses: Inventors:

No. 778,022. PATENTED DEC. 20, 1904.
O. S. FELLOWS & A. E. HOPKINS.
CAN CONTROLLING AND SEPARATING APPARATUS.
APPLICATION FILED DEC. 1, 1903.
NO MODEL. 7 SHEETS—SHEET 7.

No. 778,022.  Patented December 20, 1904.

UNITED STATES PATENT OFFICE.

OLIN S. FELLOWS AND ARCHIBALD E. HOPKINS, OF MIDDLETOWN, NEW YORK; SAID HOPKINS ASSIGNOR TO SAID FELLOWS.

CAN CONTROLLING AND SEPARATING APPARATUS.

SPECIFICATION forming part of Letters Patent No. 778,022, dated December 20, 1904.

Application filed December 1, 1903. Serial No. 183,412.

*To all whom it may concern:*

Be it known that we, OLIN S. FELLOWS and ARCHIBALD E. HOPKINS, citizens of the United States, residing at Middletown, Orange county, and State of New York, have invented certain new and useful Improvements in Can Controlling and Separating Apparatus, of which the following is a specification sufficient to enable others skilled in the art to which the invention appertains to make and use the same.

Our invention relates to means for selecting and separating from a line or series of cans presented in succession over a runway such cans as are reversed in position—that is to say, with their open end plates in the wrong direction. This precautionary measure is or may be desirable at various stages in the manufacture or subsequent use of cans, as before or after presentation to the soldering-machine, before presentation to testing apparatus, &c. Heretofore the detection and removal of such reversed cans has been accomplished by passing the cans successively over a gravity-rail, the lighter end plates of the cans causing them to be tilted by the heavier closed ends, so that reversed cans were deflected from those in proper alinement, as set forth in Letters Patent No. 636,125, dated October 31, 1899. Owing, however, to the fact that the tinned plate used in the manufacture of cans is apt to vary more or less in thickness and weight from its grade standard, it sometimes happens that the end plate with the opening in it is as heavy or heavier than the closed end plate on the opposite end of a can-body, in which case the gravity-rail cannot be relied upon to sort the cans with any degree of certainty.

Hence the main object of our invention is to substitute positive means for detecting and removing misplaced cans from the line in lieu of the gravity test, and this we accomplish by utilizing the perforated end plate of the can as a test medium, the invention consisting, broadly, in the use of one or more mechanical feelers adapted to feel the end plates of the cans in a direction substantially parallel to the axes of said cans and at right angles to their end plates and arranged to automatically deflect the cans in different directions, according to the particular end of the can presented to such mechanical feeling devices. Incidentally in this connection our invention involves the use with one or more mechanical feelers axially disposed with reference to the cans presented thereto of can-shunting mechanism automatically set and controlled by said mechanical feelers.

Our invention also includes certain other special features in the construction and arrangement of parts hereinafter set forth. Among these is the provision of means whereby the several parts of the apparatus may be adjusted to accommodate cans of different lengths and diameter, so as to avoid the necessity of duplicating the device for each size of can to be treated. Another feature of importance in this connection is the incorporation with the automatic feeling and shunting mechanism of means for eliminating from the feed all cans that are not in perfect alinement with their axes at right angles to the line of feed and parallel to the axis of the receiver. This we accomplish by forming the throat of our feeding mechanism with a relief-opening just in front of the check-lever which controls the entrance of the cans into the receiver, through which relief-opening cans advancing on end or with their longitudinal axes parallel to or not at right angles to the guide-rail will be withdrawn from the line of gravity. We are aware that in Letters Patent No. 752,341, dated February 16, 1904, we described and claimed a relief device of this character as a distinct independent device applicable to can-runways generally, and we only seek to cover herein its formation within the throat of the feed in combination with the check-lever and can feeling and shunting mechanism, in which relation it forms a special function in that it protects the comparatively delicate feelers from injury, as hereinafter set forth.

In the accompanying drawings, Fig. 4 is an elevation of the front of the apparatus. Fig. 4$^a$ is a sectional detail showing adjustable means for securing the post $a^4$ to the bracket $a^3$. Figs. 5 and 6 are detail views illustrating the action of the feeler-lever. Fig. 10 is a rear view of the apparatus, a portion of the power-pulley being shown as broken away. Fig. 11 is a rear view of one of the feeler-levers; Fig. 12, an edge view, and Fig. 13 a front view thereof.

The main features of our invention are applicable to sheet-metal cans generally, irrespective of their shape, provided one end plate of each can is perforated—that is to say, the automatic feeling and shunting of the cans by means of mechanism set by the feeler may be employed in connection with cans which are square, oval, or of any form in cross-section other than round. For convenience of illustration we have selected a cylindrical can C of greater length than diameter and having one end plate perforated to form the mouth $c$ or filling-aperture—as, for instance, in the case of the ordinary cylindrical can used for canned goods in the market—as the can to be herein described as subjected to the action of our new automatic can-controlling apparatus, it being understood that we do not limit ourselves to the treatment of cylindrical cans nor to the identical form and construction of parts shown, which may be modified more or less in adapting the apparatus to other forms of cans with like result and without departing from the spirit and intent of our invention.

In the drawings, A represents the standard, which supports the apparatus as a whole.

Figure 19:
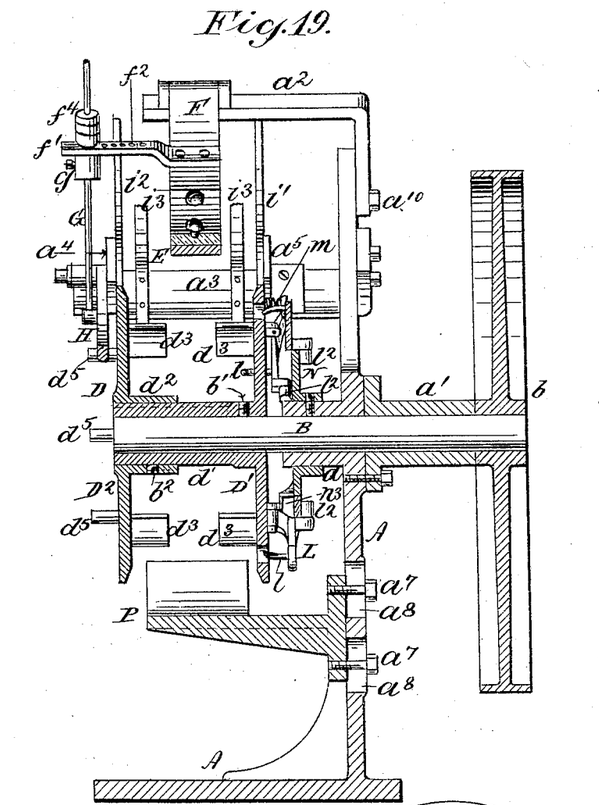
Fig. 19, a transverse section upon plane of line 19 19, Fig. 1.
Figures 20, 21:
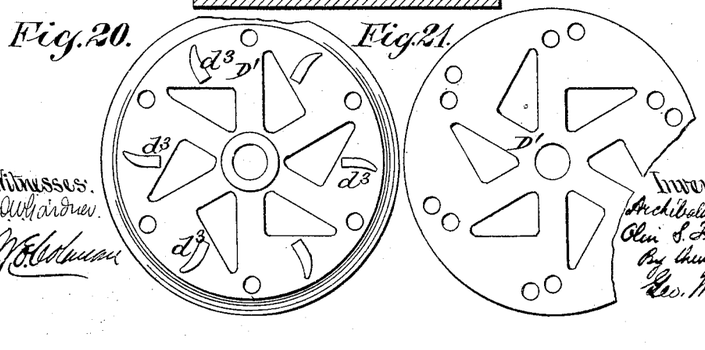
Figs. 20 and 21 are respectively front and rear views of the rotatable can-receiver.

B is a shaft journaled in the bearing $a$, forming part of the standard A, and the sleeve $a'$ bolted rigidly thereto. The power-pulley $b$ is secured to the rear end of the shaft B and the can-receiver D to the front end of said shaft, as will be understood by reference to Fig. 19, in which it will be seen that the hub $d'$ of the disk D' is rigidly attached to the shaft B by set-screw $b'$ and that the hub $d^2$ of the disk D$^2$ is rigidly secured to the hub $d'$ of the disk D' by the set-screw $b^2$ in such manner that the disk D$^2$ may be adjusted upon the hub $d'$ for the purpose of regulating the distance between the opposed inner surfaces of the disks D' D$^2$ with relation to the length of the cans to be accommodated between them.

Figure 15:
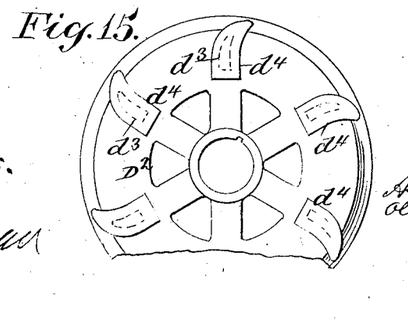
Fig. 15 is a detail view illustrating the use of fillets on the can-rests.

Projecting from the inner surfaces of the disks D' D$^2$ are can-rests $d^3$ $d^3$, each disk having six rests, situated at equidistant points and at like distance from the center, and the disks being adjusted so that the rests $d^3$ $d^3$ on the two disks coincide in position with relation to each other. Thus six seats are provided for in the receiver D shown in the drawings, although we do not limit ourselves to this number, since it is obvious that the number of seats thus created may be increased or diminished, according to the diameter of disk and number of rests $d^3$ carried thereon. The can-rests $d^3$ being rigid upon the disks D' D$^2$ obviously can properly hold and centralize only the maximum diameter of can to be passed through the receiver D. Other smaller diameters are provided for by the use of fillets $d^4$, which fit over the can-rests, as shown in Fig. 15, and by decreasing the space between the rests $d^3$ as thus covered centralize the smaller cans with relation to the can-feeling mechanism.

The cans C are fed successively to their seats between the rests $d^3$ $d^3$ from the mouth of the feed E, being controlled and timed by a check-lever F, actuated by studs $d^5$ upon the front of the disk D$^2$. The check-lever F is fulcrumed on the bracket $a^2$, secured to the standard A, and is provided on its under side with a stop or holder $f$, formed, preferably, of leather or other relatively soft material for contact with the can-bodies. The check-lever F has a laterally-projecting arm $f'$, which rests upon a collar $g$ upon the connecting-rod G, which is pivotally connected at its lower end to the lifter H, in turn pivotally connected to the post $a^4$ upon the bracket $a^3$, rigidly secured to the standard A.

The end of the upper guide-rail $i$ of the runway is secured to the bracket $a^2$, the ends of the side rails $i'$ $i^2$ to the posts $a^4$ and $a^5$ on the bracket $a^3$, and ends of the supporting-rails $i^3$ $i^3$ to the said bracket $a^3$.

In what may be designated as the "throat" of the feed E, back of the check-lever F, we form the relief-opening J, which is essentially a longitudinal slot in the floor of the runway, the width of said longitudinal slot being greater than the diameter of the cans to be treated. The portions $j$ $j$ of the floor constituting the longitudinal edges of the relief-opening J are preferably supported upon the side rails $i'$ $i^2$, one of which is adjustable with relation to each other to provide for the accommodation of cans of different lengths, or if it is desired to support the floor-sections $j$ $j$ independently provision is made for the lateral adjustment of one of them with relation to each other for the same purpose. As shown in the drawings, the floor-sections are attached to the side rails $i'$ $i^2$, and the post $a^4$, to which the side rail $i^2$ is attached, is adjustable upon the bracket $a^3$, provision being made to support the rail $i^2$ adjustably beyond the relief J also in any suitable or well-known manner. The post $a^4$ is shown as adjustable upon the bracket $a^3$ by means of set-screws $a^6$ $a^6$, passing through slots $a^7$ $a^7$ in the bracket $a^3$, as may be seen by reference to Fig. 4. The relief-opening J performs an important function in that it prevents the entrance of cans lengthwise into the receiver D, in which case they are apt to pass through the receiver D and rest on end on the platform P, thereby holding back succeeding cans and clogging the receiver. As a consequence, owing to the continued rotation of the receiver D, the delicate feeler-fingers $l$, hereinafter described, would be brought into collision with the stalled cans and bent or broken, thereby rendering the apparatus inoperative.

In our construction of apparatus it will be noted that one side (the rear) is stationary, while the front is adjustable with relation thereto. For instance, the front disk $D^2$ is adjustable with relation to the rear disk $D'$, as hereinbefore described, and the side rail $i^2$ is adjustable with relation to the other side rail, $i'$, as just stated. The lifter H, being pivotally connected to the post $a^4$, is adjustable therewith, and to permit of this adjustment the laterally-projecting arm $f'$ of the check-lever F is formed with a series of holes or notches $f^2$ $f^2$, in or through any of which the end of the connecting-rod G may be passed.

The free end of the check-lever F is provided with a flexible tongue $f^3$, preferably though not necessarily of leather or similar relatively soft flexible material, said tongue $f^3$ being designed to seat the cans gently but positively between adjoining rests $d^3$ in the receiver D. The downward pressure exerted by the check-lever F is regulated by weights $f^4$, hung upon the upper end of the connecting-rod G and resting upon the top of the arm $f'$. The weights may be otherwise applied to the check-lever or any equivalent mechanical expedient resorted to to attain a prescribed or desired degree of gravity resistance.

Figure 16:
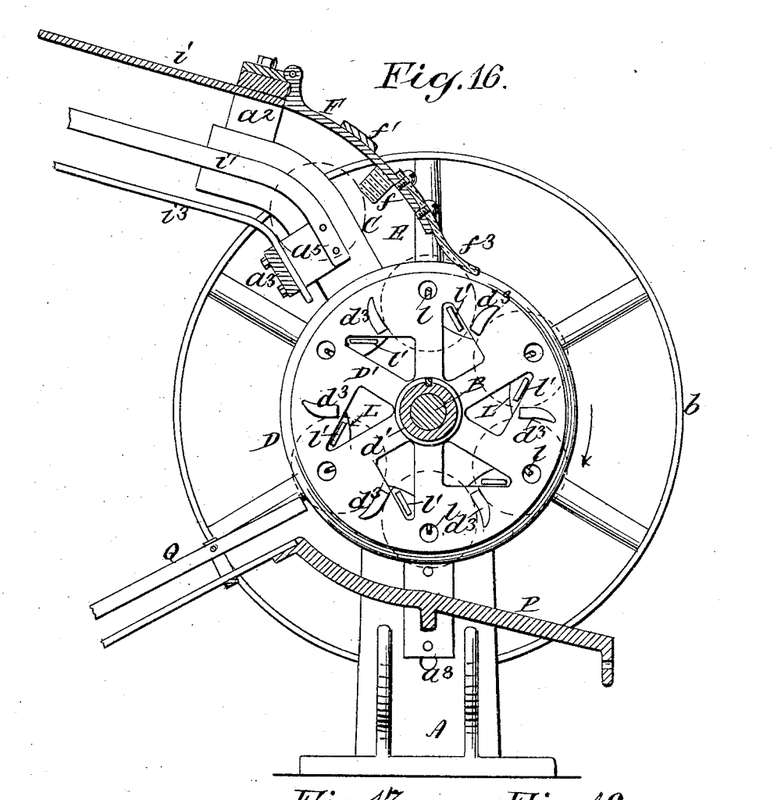
Fig. 16 is a central longitudinal section of the apparatus.
Figure 17:
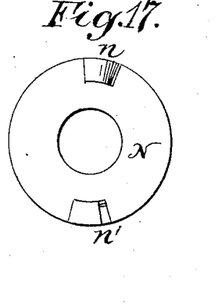
Figs. 17 and 18 are respectively front and rear views of the can-port disk.
Figure 18:
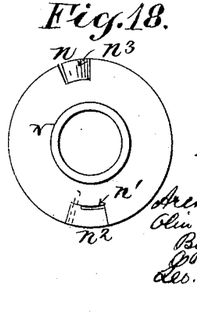

To the rear side of the disk $D'$ are pivoted six feeler-levers L L, each provided with a feeler-finger $l$ and with a can bearing or holder $l'$, both of which project through openings in the disk $D'$, as will be seen by reference to Fig. 16. A spring $m$, interposed between the rear or short arm of each lever L and the rear side of the disk $D'$, tends constantly to force the long arm of the lever against the rear surface of the disk $D'$, and thus cause the finger $l$ and the can-holder $l'$ to protrude through the disk $D'$. On the long arm of each lever L is mounted a roller $l^2$ in such manner as to project laterally beyond the side of the lever and to overlap one side or the other of the edge of the stationary cam-port disk N. The cam-port disk N is rigidly secured to the bearing $a$, which forms part of the standard A, and is the only operative part of the feeler mechanism that is stationary, the disks $D'$ $D^2$ rotating with the shaft B. The disk N is formed with an upper cam-port $n$ and a lower cam-port $n'$, the latter being provided with a flap-gate $n^2$. In front of each cam-port $n$ $n'$ is an inclined cam or guide $n^3$, the rear surfaces of which are adapted for contact with the rollers $l^2$ upon the feeler-levers L, as hereinafter described.

P is a platform upon which cans passing through the receiver D with their closed ends toward the rear disk $D'$ drop, and Q is a runway to which cans reversed in position are carried by the can feeling and holding mechanism, both platform P and runway Q being supported adjustably on the standard A, as by means of the binding-screws $a^7$ $a^7$ passing through the vertical slots $a^8$ $a^8$ in the standard or by any other suitable means by which the distance between the platform P and the ways Q and the rotatable can-receiver D may be regulated to meet the requirements of different sizes of cans. The top rail $i$ and the check-lever F are made adjustable with relation to the parts below to accommodate different sizes of cans by any suitable mechanical expedient, as by forming the bracket $a^2$ with parallel slots $a^9$ $a^9$, through which the binding-screws $a^{10}$ $a^{10}$ secure it to the standard pass. It will thus be seen that by our construction we attain practically a universal adjustment of the parts by means of which the apparatus may be readily changed to sort cans of different sizes both in width and length.

Figures 1, 2, 3:
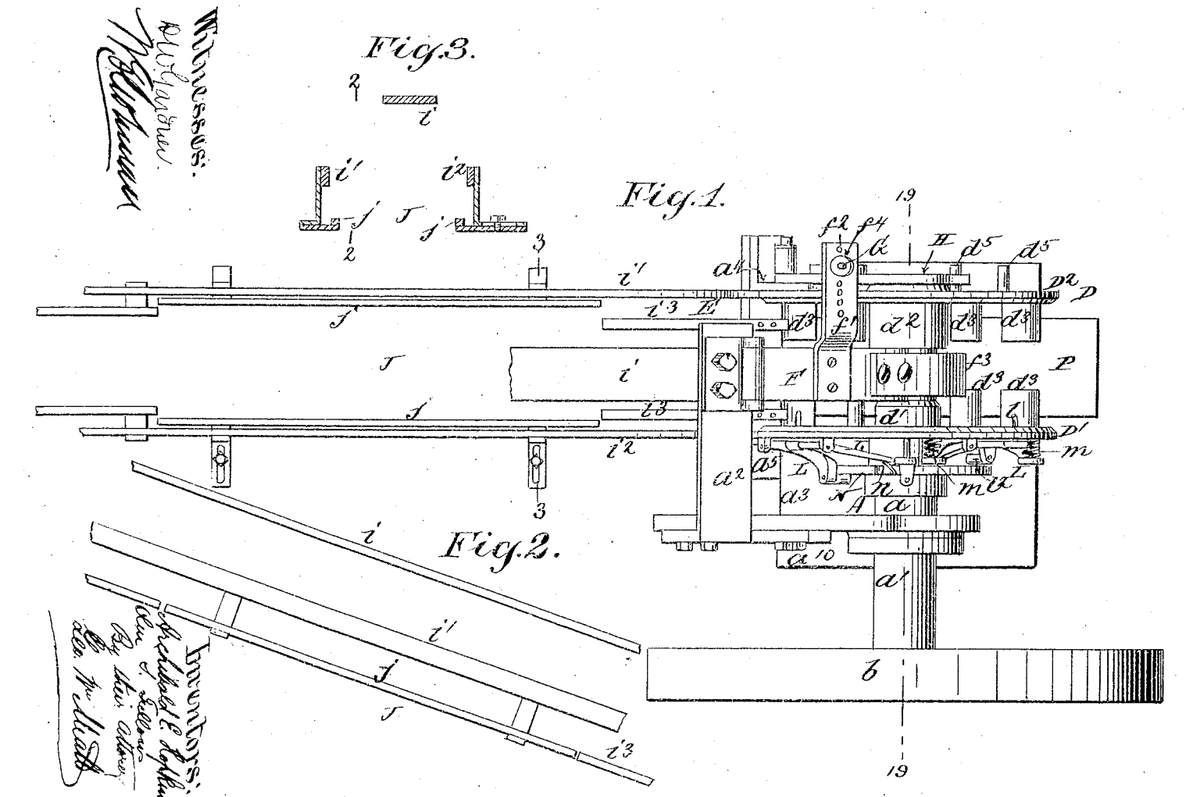
Figure 1 is a plan of our can controlling and separating apparatus.
Fig. 2 is a central longitudinal section of the feed end of the runway on plane of line 2 2, Fig. 3.
Fig. 3, a transverse section upon plane of line 3 3, Fig. 1.
Figures 4, 4A, 5, 6:
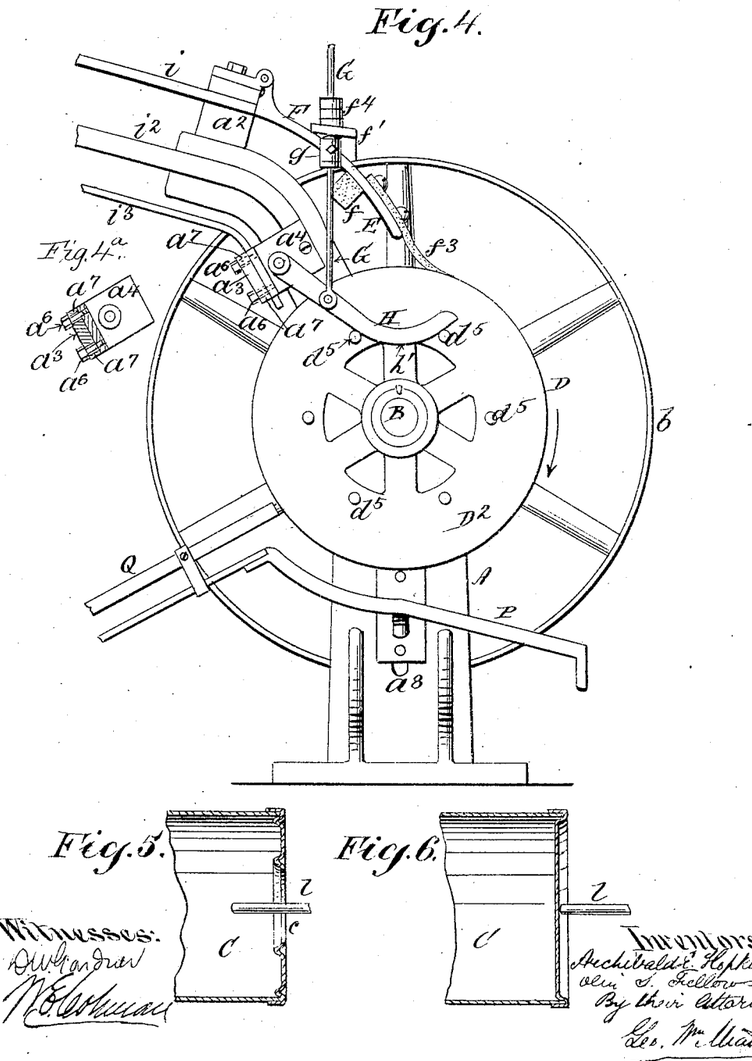
Figures 7, 8, 9:
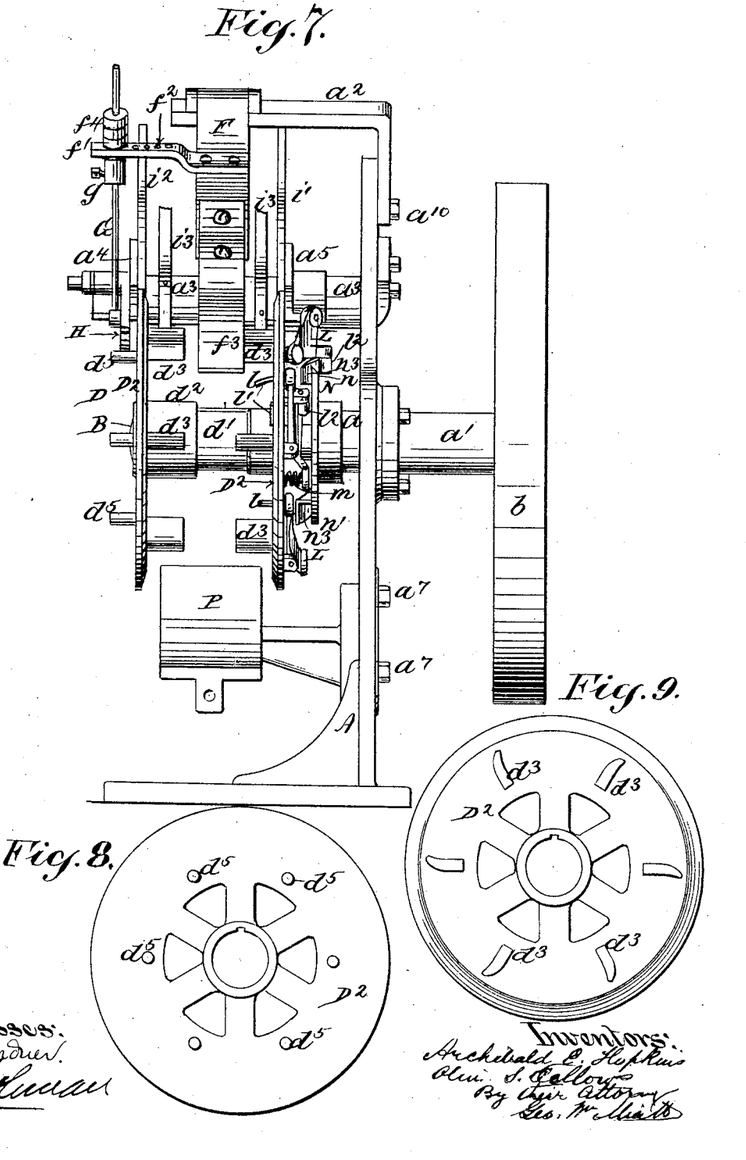
Fig. 7 is an end elevation of the apparatus.
Figs. 8 and 9, respectively, front and rear views of the front disk of the rotatable can-receiver.
Figures 10, 11, 12, 13:
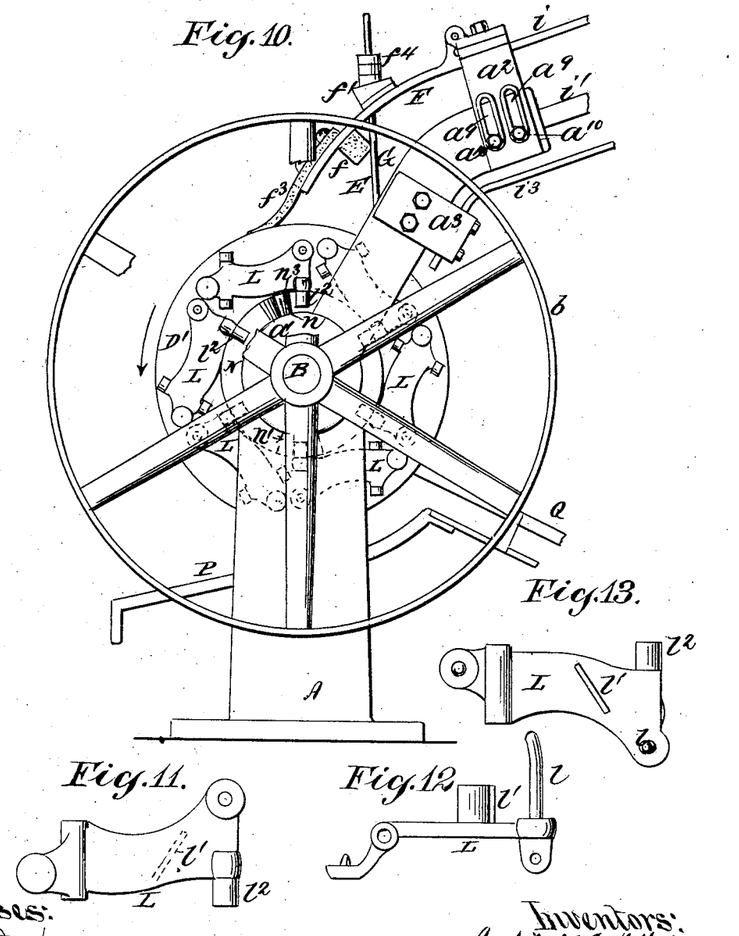
Figure 14:
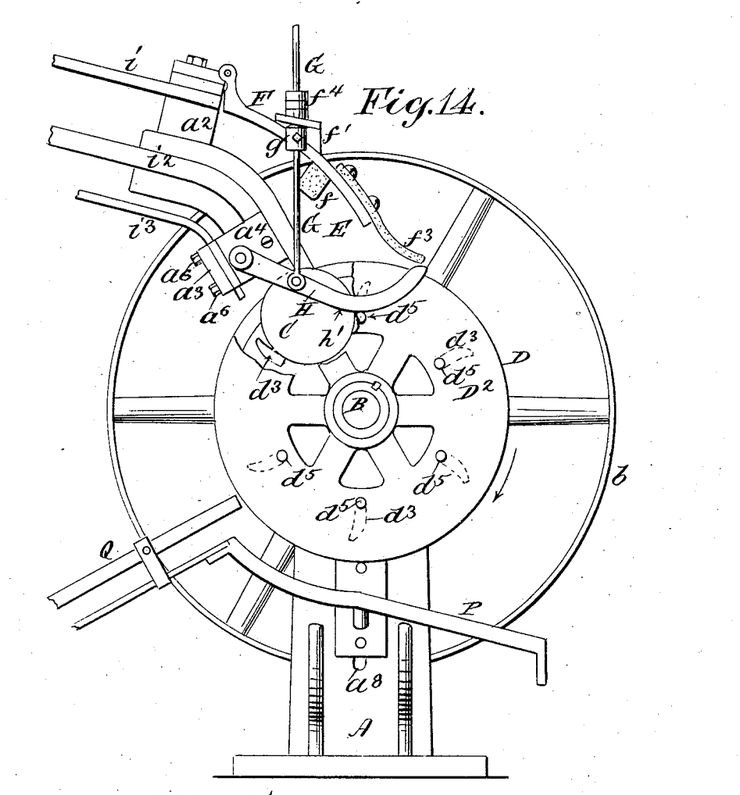
Fig. 14 is a front view of the apparatus, partly broken away, illustrating the action of the feeding mechanism.

The operation of our improved mechanism for controlling and separating cans is as follows: If any of the cans passing toward the feed E over the runway are on end or with their longitudinal axes parallel to the rails or out of alinement therewith, they drop through the relief-opening J, and the possibility of damage to the delicate feeler-fingers $l$ $l$ is avoided, as hereinbefore described. Cans with their longitudinal axes at right angles to the runway will pass over the relief-opening J and into the feed E. Now presuming by way of illustration that the convex under side $h'$ of the lifter H is between two of the studs $d^5$ $d^5$ on the face of the rotating receiver-disk $D^2$ and the check-lever F, consequently in its lowest position, as shown in Fig. 4, a can passing successfully over the relief-opening J will encounter the holder $f$ on the under side of the check-lever F and be detained thereby until the rotation of the can-receiver D in the direction of the arrows in the different views of the drawings causes one of the studs $d^5$ on the face of the outer disk $D^2$ to raise the lifter into the position shown in Fig. 14, thereby through the medium of the connecting-rod G raise the check-lever F sufficiently to release the can from the holder $f$, when it drops onto and between adjoining can-rests $d^3$ $d^3$ in the receiver D, as shown in Fig. 14. The position of the can-rests $d^3$ $d^3$ with relation to the feeling-levers is such that the opening $c$ in a can end plate, if that end of the can is toward the rear disk D' of the receiver, will coincide with one of the openings through which one of the finger-feelers $l$ protrude when the feeler-lever is not held back by the cam-port disk or by reason of the feeler-finger encountering the solid end of a can end plate. At the instant the can is brought by the rotation of the receiver D into the highest position or into any other prescribed position for which the parts may be set and timed the roller $l^2$ on the adjacent feeler-lever L, (which roller has been riding over the rear surface of the cam-port disk N) comes into coincidence with the upper port $n$ in the disk N. As a consequence if the can end plate next the inner disk D' of the receiver is formed with the perforation $c$ the spring $m$ throws the point of the feeler-finger through the disk D' and into the can, at the same time forcing the can-holder $l'$ against the can end plate at one side of the perforation $c$, the roller $l^2$ necessarily and simultaneously dropping through the port $n$ and in front of the cam-disk N, in which condition the parts remain until the roller encounters the inclined guide-surface $n^3$ at the lower port $n'$, which inclined guide-surface $n^3$ forces the roller back against the resistance of the spring $m$ through the lower port $n$ and flap-gate $n^2$ and onto the rear surface of the disk N, thereby releasing the can, which is carried into the runway Q by reason of the momentum acquired from the rotation of the receiver D. On the contrary, if the end of the can presented to the feeler-finger is unperforated it holds back the lever L until the roller $l^2$ has passed beyond the upper port $n$, in which case the roller continues to travel over the rear surface of the disk N and over the flap-gate, the rear surface of which forms a continuation of the rear surface of the disk when the flap is closed, said flap-gate opening to the rear only and only to release the feeler-lever, as above set forth. Under these conditions the can simply lies loosely on the rests $d^3$ $d^3$ until the rotation of the receiver D allows it to drop by gravity onto the platform P, from which it rolls and is disposed of in any desired manner.

It is to be noted that while there is a duplication of feeling mechanism for each can-seat provided in the rotatable can-receiver the construction and operation of the apparatus is simple, while its capacity is only limited by the speed at which it is possible to drop cans separately from the mouth of the feed into the receiver, since the rotatable receiver itself times and operates the feed. Since the "drop" or distance between the detent $f$ on the check-lever F to the adjoining rests $d^3$ $d^3$ in the receiver D need be but little more than the diameter of the can used, it is thus obvious that the speed at which the apparatus may be run is practically unlimited and more than ample to meet all requirements of use. It is further to be noted that a distinguishing feature of our invention consists in the fact that it is the cans which present their perforated ends to the feeling mechanism which are clamped and carried beyond the point of discharge of those presenting their solid end plates thereto, the end plates in the latter case simply holding the feeler-lever back until its roller is brought into contact with the rear surface of the cam-port disk, when the can is relieved from pressure to fall from its seat by gravity when below the axis of the receiver, whereas the perforated can ends by allowing the feeler to enter the can insure the clamping thereof and its transportation until the feeler-lever is automatically retracted beyond the vertical axial plane of the receiver.

What we claim as our invention, and desire to secure by Letters Patent, is—

1. In can controlling and separating apparatus, the combination with mechanism for automatically feeding and presenting cans thereto, of mechanism axially disposed with reference to the cans so presented arranged to automatically contact with the end plates of the cans, to enter and clamp those presenting their perforated end plates, and to carry such cans beyond the point of discharge of those presenting their solid end plates thereto, for the purpose described.

2. In can controlling and separating apparatus, the combination with mechanism for automatically feeding and presenting cans thereto, of mechanism adapted to automatically engage the ends of cans so presented in a direction substantially parallel with the axis of the cans, and to enter and clamp the cans presenting their perforated end plates and to separate such cans from those presenting their solid end plates.

3. In can controlling and separating apparatus, the combination with mechanism for automatically feeding and presenting cans thereto, of a mechanical feeler axially disposed with reference to the cans so presented arranged to automatically contact with the end plates of said cans, to enter and clamp those presenting their perforated end plates and to set and control mechanism by which cans presenting their solid end plates to the feeler are deflected from those clamped by feeler, together with said deflecting mechanism.

4. In can controlling and separating apparatus the combination of automatic feed mechanism formed with a longitudinal relief-opening in the floor thereof, said relief-opening being of greater length than the cans to be treated and of greater width than the diameter of said cans, whereby cans out of alinement are eliminated from the apparatus, mechanism for automatically presenting cans which pass over said relief-opening to the action of mechanical feelers, said mechanical feelers, and can-shunting mechanism set and controlled by said mechanical feelers in such manner that cans reversed in position are separated from the others.

5. In can controlling and separating apparatus, the combination of automatic feed mechanism formed with a longitudinal relief-opening in the floor thereof, said relief-opening being of greater length than the cans to be treated and of greater width than the diameter of the said cans, whereby cans not in alinement are eliminated from the apparatus, and mechanism for automatically and mechanically feeling cans passing over said relief-opening and separating those reversed in position from the others.

6. In can-controlling apparatus, the combination of automatic feed mechanism formed with a longitudinal opening in the floor thereof for the purpose of eliminating cans not having their longitudinal axes at right angles to the line of feed, said relief-opening being of a width greater than the diameter of the cans, automatic mechanism for presenting the cans which pass in alinement over said relief-opening to feeling mechanism axially disposed with reference to the cans so presented, said feeling mechanism arranged to automatically coöperate with the solid and perforated end plates of the cans and to separate those presenting their solid end plates from those presenting their perforated ends plates thereto.

7. In can controlling and separating apparatus, the combination of automatic feed mechanism formed with a longitudinal opening in the floor thereof for the purpose of separating and removing cans not in proper alinement said relief-opening being of greater length than the cans to be treated and of a width greater than the diameter of the cans, automatic mechanism for presenting the cans which pass in alinement over said relief-opening to the action of mechanical feelers, and said mechanical feelers, arranged to automatically separate cans reversed in position from the other cans.

8. In can controlling and separating apparatus, the combination with mechanism for automatically feeding cans thereto, of a rotatable can-receiver, a mechanical feeler axially disposed with reference to the cans presented by said rotatable receiver, arranged to automatically contact with the end plates of said cans, to enter and clamp those presenting their perforated end plates and to set and control mechanism by which cans presenting their solid end plates to the feeler are deflected from those clamped by feeler, together with said deflecting mechanism.

9. In can controlling and separating apparatus, the combination of a rotatable can-receiver, an automatic feed actuated by said receiver, a mechanical feeler axially disposed with reference to the cans so presented arranged to automatically contact with the end plates of said cans, to enter and clamp those presenting their perforated end plates and to set and control mechanism by which cans presenting their solid end plates to the feeler are deflected from those clamped by feeler, together with said deflecting mechanism.

10. In can controlling and separating apparatus, the combination of a rotatable can-receiver, an automatic feed actuated by said rotatable receiver, means upon said rotatable receiver for feeling the ends of the cans, means for operating said feeling mechanism automatically, and means for carrying the cans which present their open end plates to the feelers beyond the point of discharge of the other cans.

11. In can controlling and separating apparatus, the combination of automatic feed mechanism, a rotatable can-receiver consisting of two opposed disks provided with can-rests, and automatic can-end-feeling mechanism, arranged to retain upon their seats cans presenting their open ends to the feelers until the point of discharge for the other cans is passed.

12. In can controlling and separating apparatus, the combination of automatic feed mechanism, a rotatable can-receiver consisting of two opposed disks formed with can-rests, automatic mechanism to retain upon their seats cans presenting their open ends to the feelers until point of discharge of the other cans is passed, and means for adjusting the two said disks with relation to each other, for the purpose of adapting the receiver to cans of different lengths.

13. In can controlling and separating apparatus, the combination of an automatic feed, a rotatable can-receiver consisting of two opposed disks formed with can-rests, a series of feeler-levers arranged automatically to feel the ends of the cans on said can-rests, and to bind those presenting their perforated ends to the feelers, and means for automatically releasing the said held cans beyond the point of discharge of the other cans.

14. In can controlling and separating apparatus, the combination of an automatic feed, a rotating can-receiver, consisting of two opposed disks formed with can-rests, a series of feeler-levers upon one disk arranged to press against the end plates of cans presenting their open end plates to the feelers, and means for automatically releasing the cans so presented beyond the point of discharge of the other cans.

15. In can controlling and separating apparatus, one or more can-feelers arranged to bear only upon and hold temporarily cans presenting their open end plates thereto, for the purpose described.

16. In can controlling and separating apparatus, means for feeding the cans successively and automatically, means for holding the cans stationary while they are presented to automatic feeling mechanism, and said automatic feeling mechanism axially disposed with reference to the cans so presented, and arranged to bear only upon cans presenting their open end plates thereto.

17. In can controlling and separating apparatus, automatic feed mechanism, a rotatable can-receiver consisting of two opposed disks formed with can-rests, a series of feeler-levers pivotally supported upon the rear side of one disk each formed with a feeler-finger, can-bearing and cam roller, and provided with a spring which tends constantly to tilt the feeler-lever toward the disk upon which it is mounted, and a stationary cam-port disk arranged to act upon the said cam-roller, for the purpose described.

18. In can controlling and separating apparatus, the combination with the rotatable can-receiver and automatic feeling and can-separating mechanism, of the automatic feed E, consisting of the supporting and side rails $i'$, $i^2$, $i^3$, and the check-lever F, formed with the can-holder $f$, and actuated through the medium of the connecting-rod G, and lifter H, by the studs $d^5$, upon the rotatable can-receiver, substantially as set forth.

19. In can controlling and separating apparatus, the combination of the rotatable can-receiver, of means for automatically feeling and separating the cans, the automatic feed E, consisting of the supporting side rails and the pivotally-supported check-lever F, formed with the can-holder $f$, and the flexible tongue $f^3$, together with means for raising and lowering the said check-lever F, automatically for the purpose set forth.

20. In can controlling and separating apparatus, the combination with the rotatable can-receiver, and mechanism for automatically feeling and separating the cans, the automatic feed E, consisting of the supporting and side rails, and of a check-lever F, and means for raising and lowering the same automatically, together with means for adjusting the said check-lever with relation to the supporting-rails for the purpose of adapting said check-lever to act upon the cans of different sizes.

21. In can controlling and separating apparatus, the combination of a rotatable can-receiver, an automatic feed actuated by said receiver and formed with means for adjusting the width of the runway to conform to cans of different sizes, a mechanical feeler axially disposed with reference to the cans presented by said rotatable receiver arranged to automatically contact with the end plates of said cans, to enter and clamp those presenting their perforated end plates and to set and control mechanism by which cans presenting their solid end plates to the feeler are deflected from those clamped by feeler, together with said deflecting mechanism.

22. In can controlling and separating apparatus, the combination with the rotatable can-receiver, and means for automatically feeling and separating cans, of the automatic feed E, consisting of the supporting and side rails and the check-lever F, formed with the can-holder $f$, together with the connecting-rod G, lifter H, and actuating-studs $d^5$, upon the rotatable can-receiver, said lifter H being pivotally connected to a part which is adjustable laterally for the purpose set forth.

23. In can controlling and separating apparatus, a can-receiver, and mechanism for automatically feeling and separating the cans, of the automatic feed E, consisting of the supporting and side rails, the check-lever F, formed with the can-holder $f$, and with a lateral arm $f'$, formed with notches or perforations $f^2$, the connecting-rod G, the lifter H, pivotally attached to a part which is laterally adjustable with relation to the runway, and the actuating can-receiver, together with means for adjusting the said disk $D^2$, with relation to the opposed disk $D'$, for the purpose set forth.

24. In can controlling and separating apparatus, the combination of the opposed disks $D'$, $D^2$, formed with the can-rest $d^3$, the hub $d^2$, of the disk $D^2$, being adjustable upon the hub $d'$, for the purpose set forth.

25. In can controlling and separating apparatus, the combination of the opposed disks $D'$, $D^2$, formed with the can-rests $d^3$, of the levers L, pivotally mounted upon the rear of the disk $D'$, and formed with the feeling-fingers $l$, and can-bearings $l'$, together with the cam-rollers $l^2$, and springs $m$, and the stationary cam-port disk N, formed with the cam-ports $n$, $n'$, cam-surface $n^3$, and flap-gate $n^2$, for the purpose set forth.

26. In can controlling and separating apparatus, the combination with the rotatable can-receiver, formed with the can-rests $d^3$, the fillets $d^4$, setting over said can-rests $d^3$, for the purpose described.

27. In can controlling and separating apparatus, the combination with the rotatable can-receiver, and automatic can feeling and separating mechanism, of can-receiving surfaces P and Q, and means for adjusting the same with relation to the said can-receiver, for the purpose set forth.

OLIN S. FELLOWS.
ARCHIBALD E. HOPKINS.

Witnesses:
GEO. WM. MIATT,
D. W. GARDNER.